(12) United States Patent
Pantke et al.

(10) Patent No.: US 10,578,157 B2
(45) Date of Patent: Mar. 3, 2020

(54) RADIAL-AXIAL MAGNETIC BEARING HAVING AN INTEGRATED BACK-UP BEARING AND METHOD FOR OPERATING THE MAGNETIC BEARING

(71) Applicants: THYSSENKRUPP ROTHE ERDE GMBH, Dortmund (DE); THYSSENKRUPP TRANSRAPID GMBH, Kassel (DE); thyssenkrupp AG, Essen (DE)

(72) Inventors: Klaus Pantke, Arnsberg (DE); Qinghua Zheng, München (DE); Erhard Lampersberger, München (DE); Bernd Lüneburg, Mülheim (DE); Jörg Rollmann, Lippstadt (DE); Florian Dignath, München (DE)

(73) Assignees: THYSSENKRUPP ROTHE ERDE GMBH, Dortmund (DE); THYSSENKRUPP TRANSRAPID GMBH, Kassel (DE); THYSSENKRUPP AG, Essen (DE)

( * ) Notice: Subject to any disclaimer, the term of this patent is extended or adjusted under 35 U.S.C. 154(b) by 70 days.

(21) Appl. No.: 15/574,191

(22) PCT Filed: Feb. 12, 2016

(86) PCT No.: PCT/EP2016/052952
§ 371 (c)(1),
(2) Date: Nov. 15, 2017

(87) PCT Pub. No.: WO2016/184582
PCT Pub. Date: Nov. 24, 2016

(65) Prior Publication Data
US 2018/0128314 A1    May 10, 2018

(30) Foreign Application Priority Data
May 21, 2015 (DE) .......... 10 2015 108 081

(51) Int. Cl.
*H02K 7/09* (2006.01)
*F16C 32/04* (2006.01)
(Continued)

(52) U.S. Cl.
CPC ...... *F16C 32/0442* (2013.01); *F16C 32/0485* (2013.01); *F16C 17/10* (2013.01);
(Continued)

(58) Field of Classification Search
CPC ... H02K 7/09; F16C 32/0442; F16C 32/0485; F16C 32/0402; F16C 32/0489;
(Continued)

(56) References Cited

U.S. PATENT DOCUMENTS

2004/0022653 A1* 2/2004 Brunet ............... F16C 32/0442
417/423.5
2010/0181854 A1* 7/2010 Breucker ............ F16C 32/0493
310/90.5

FOREIGN PATENT DOCUMENTS

| CN | 101881302 A | 11/2010 |
| CN | 102537047 A | 7/2012 |

(Continued)

OTHER PUBLICATIONS

Machine translation of DE-102005030724-A1. (Year: 2007).*
(Continued)

*Primary Examiner* — Michael Andrews
(74) *Attorney, Agent, or Firm* — thyssenkrupp North America, Inc.

(57) ABSTRACT

A magnetic bearing may include an inner ring and an outer ring arranged concentrically. The inner ring and the outer ring may be mounted rotatably relative to each other by way of axial and radial magnets. The magnetic bearing may also include a back-up bearing, which is integrated into at least one of the outer ring or the inner ring both in an axial
(Continued)

direction and in a radial direction. The outer ring may be multipiece and may include a recess that opens inwards and receives the inner ring. Further, the back-up bearing may be made of aluminum, austenitic steel, bronze, or ceramic, and the back-up bearing may operate as a shielding device that shields magnetic fields emitted by the axial and radial magnets from one another.

14 Claims, 5 Drawing Sheets

(51) Int. Cl.
*F16C 39/02* (2006.01)
*F16C 17/10* (2006.01)

(52) U.S. Cl.
CPC ...... *F16C 32/0402* (2013.01); *F16C 32/0489* (2013.01); *F16C 39/02* (2013.01); *F16C 2300/14* (2013.01); *F16C 2300/20* (2013.01)

(58) Field of Classification Search
CPC ...... F16C 17/10; F16C 39/02; F16C 2300/14; F16C 2300/20
USPC ........................................................ 310/90.5
See application file for complete search history.

(56) References Cited

FOREIGN PATENT DOCUMENTS

| | | | |
|---|---|---|---|
| CN | 202451603 | U | 9/2012 |
| CN | 203796751 | U | 8/2014 |
| DE | 2163199 | A | 7/1973 |
| DE | 2803474 | A | 8/1979 |
| DE | 2842165 | A | 4/1980 |
| DE | 102005030724 | A | 1/2007 |
| DE | 102005030724 | A1 * | 1/2007 .......... F16C 32/0457 |
| DE | 102006017933 | A | 10/2007 |
| DE | 102008038978 | A | 4/2009 |
| DE | 102012101649 | | 8/2013 |
| DE | 102012101651 | | 8/2013 |
| EP | 2154386 | A | 2/2010 |
| EP | 2557278 | A | 2/2013 |
| EP | 2808572 | A | 12/2014 |
| JP | S52-024616 | A | 2/1977 |
| JP | H02-256918 | A | 10/1990 |
| WO | 2009021721 | A | 2/2009 |

OTHER PUBLICATIONS

English translation of International Search Report issued in PCT/EP2016/052952, dated Sep. 8, 2016 (dated Sep. 16, 2016).
English abstract for DE102005030724A.
English abstract for DE102006017933A.

* cited by examiner

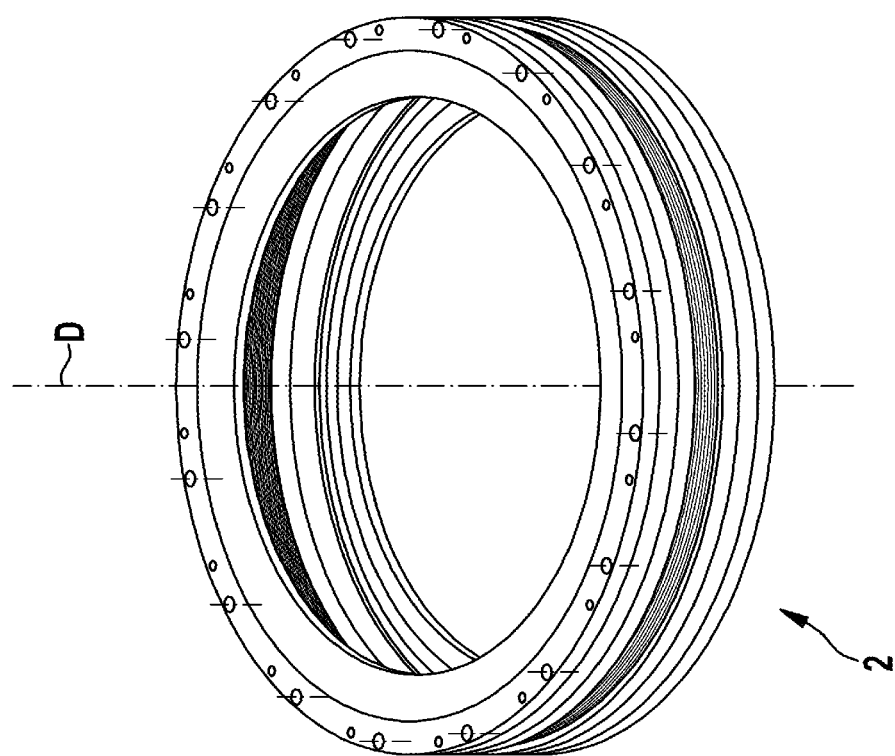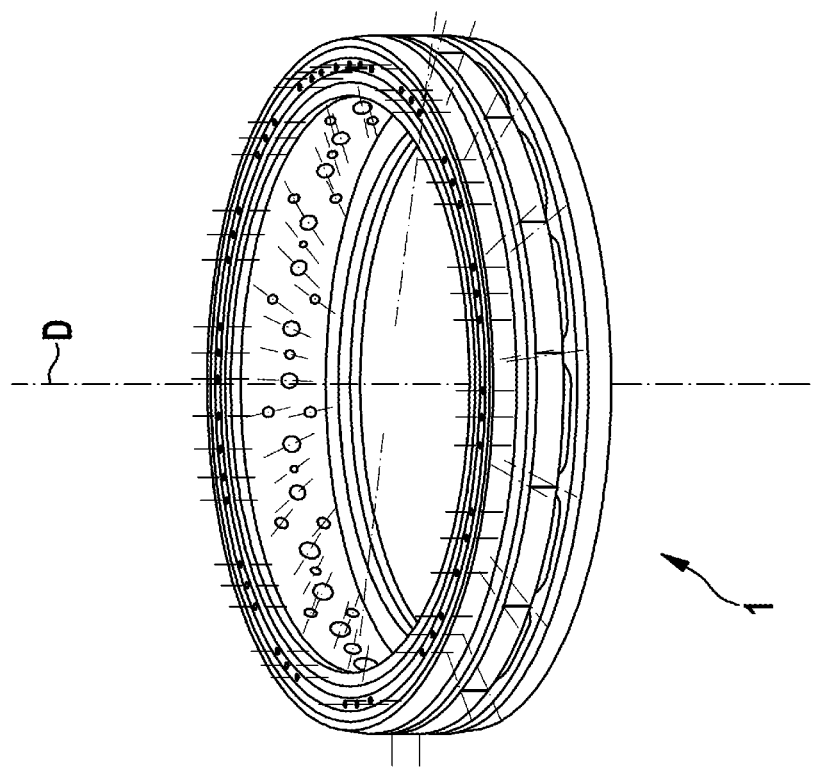
Fig. 1

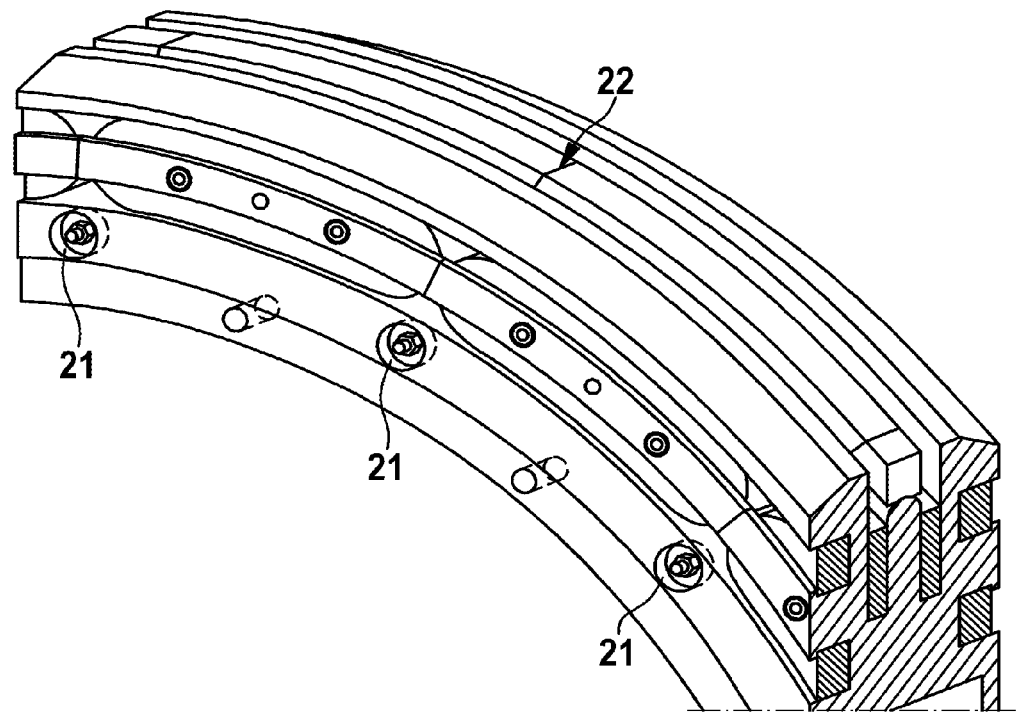
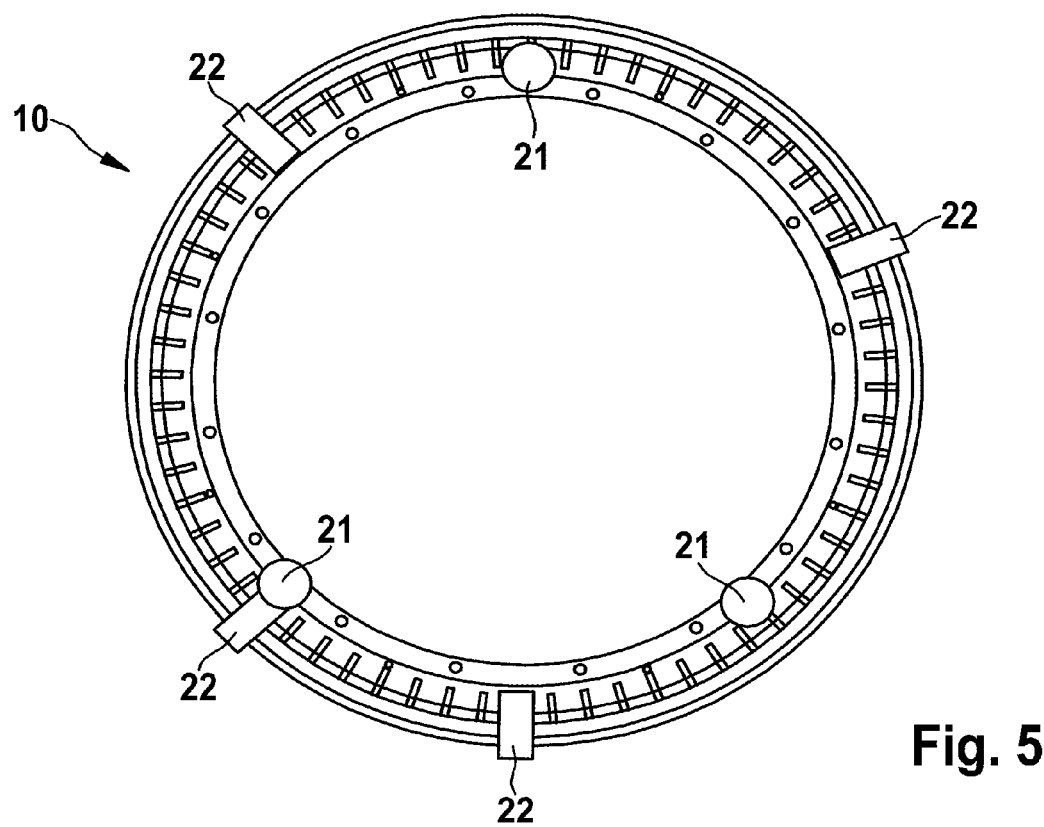
Fig. 5

RADIAL-AXIAL MAGNETIC BEARING HAVING AN INTEGRATED BACK-UP BEARING AND METHOD FOR OPERATING THE MAGNETIC BEARING

CROSS REFERENCE TO RELATED APPLICATIONS

This application is a U.S. National Stage Entry of International Patent Application Serial Number PCT/EP2016/052952, filed Feb. 12, 2016, which claims priority to German Patent Application No. DE 10 2015 108 081.8 filed May 21, 2015, the entire contents of both of which are incorporated herein by reference.

FIELD

The present disclosure generally relates to magnetic bearings and methods for operating magnetic bearings, including radial-axial magnetic bearings having integrated back-up bearings.

BACKGROUND

Magnetic bearings have been known for a long time in the prior art, and allow the contactless arrangement of two bearing parts relative to each other. In particular, because of the negligibly low friction between the bearing parts, a rotor can thus be provided with which the achievable rotation speeds are higher than those normally achievable with plain or roller bearings.

To create a magnetic bearing, typically magnets, e.g. permanent magnets and/or coils, are integrated in the rotor and a stator of the magnetic bearing. Coils can usually be operated simply by application of an electrical voltage. Because of the use of coils supplied with an electrical voltage, in the event of a power failure, for example, there is a risk that the rotor will break away from its contactless arrangement relative to the stator and destroy the bearing. For safety reasons, the magnetic bearing usually therefore has a back-up device which captures the rotor in such a scenario.

Usually, this back-up device is arranged filling the installation space, in particular between the outer ring and the inner ring, which hinders integration in other components. Also, the high energy requirement for a magnetic bearing is in many cases decisive for the use of a roller bearing or a plain bearing instead of a magnetic bearing, although the magnetic bearing is typically superior to the roller bearing or plain bearing in terms of wear, noise generation and achievable rotation speeds.

Thus a need exists for a magnetic bearing that is configured compactly, and the efficiency of which is improved relative to magnetic bearings known from the prior art.

BRIEF DESCRIPTION OF THE FIGURES

FIG. 1 is a perspective view of an example outer ring and an example inner ring for an example magnetic bearing.

FIG. 5 includes a partial perspective view (top) and a top view (bottom) of example sensor devices on a magnetic bearing.

DETAILED DESCRIPTION

Figure 2:
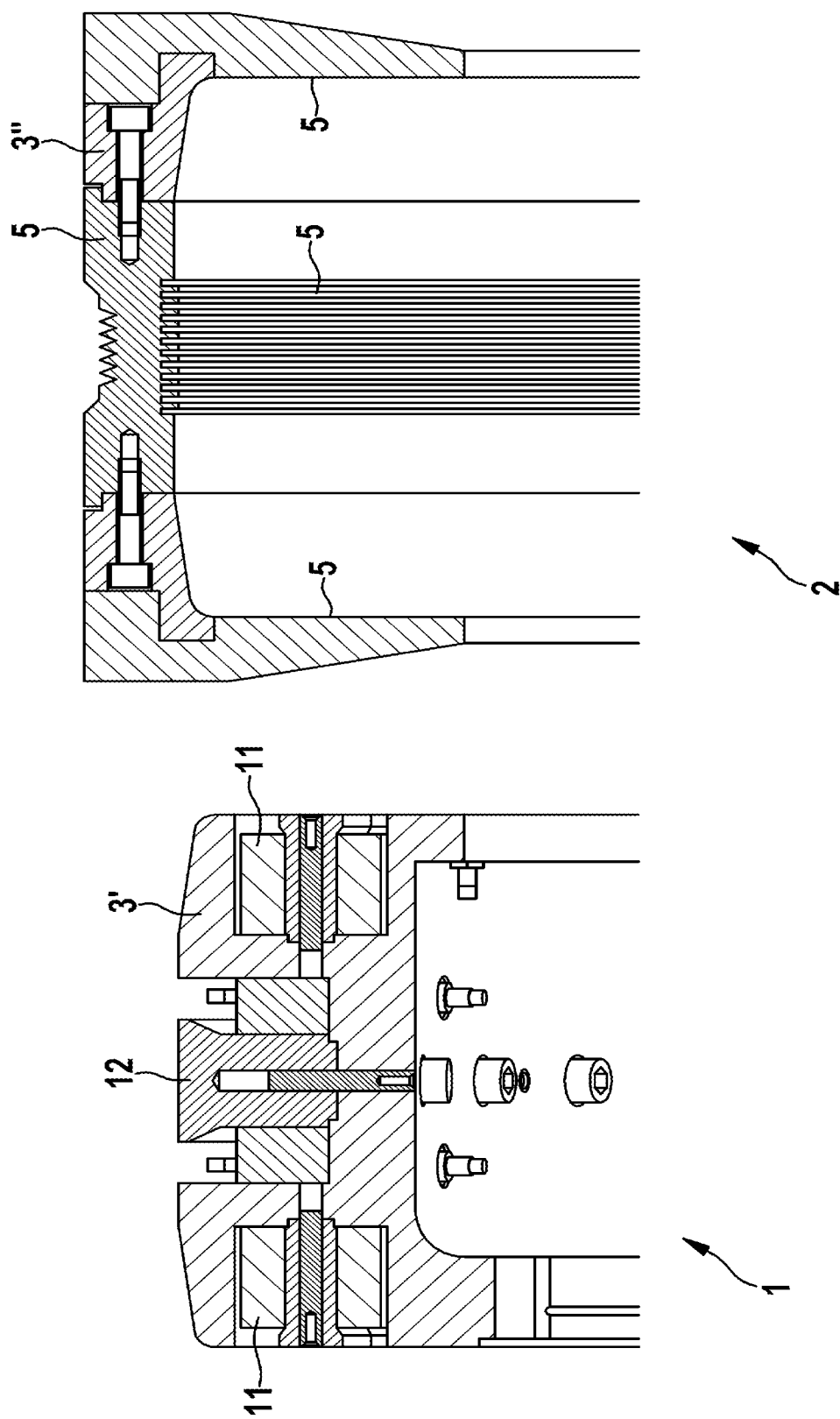
FIG. 2 is a sectional view of an example outer ring and an example inner ring for a magnetic bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a magnetic bearing may have an inner ring and an outer ring arranged concentric to the inner ring, wherein the inner ring and the outer ring are mounted rotatably relative to each other by means of axial and radial magnets. The magnetic bearing may have a back-up bearing part of a back-up bearing, which is integrated into the outer ring and/or the inner ring both in an axial direction and in a radial direction.

Compared with the prior art, the back-up bearing is an integral part of the magnetic bearing in that it is integrated into the outer ring and/or the inner ring. The back-up bearing is thus integrated or let into the inner ring and/or outer ring, such that the back-up bearing can capture the inner ring or outer ring in the axial direction or radial direction, in particular if, for example due to a power failure, the mounting of the inner ring and outer ring by means of the axial and radial magnets can no longer be guaranteed. Thus advantageously, separate back-up devices may be omitted, which would otherwise have to be arranged between the outer ring and inner ring and would provide security in the radial or axial direction. The integrated back-up bearing can effectively capture a rotor, formed by the inner ring or outer ring and mounted rotatably about a rotation axis, in both the axial and in the radial direction, i.e. in a direction parallel to and perpendicular to the rotation axis, without the back-up bearing taking up additional installation space.

Preferably, the inner ring and the outer ring, as bearing parts of the magnetic bearing, form a system of a stator and a rotor rotating about the rotation axis. In particular, the inner ring is the stator and the outer ring is the rotor, or vice versa. For example, for the axial and radial magnets, it is provided that the inner ring comprises several axial magnets arranged along the periphery of the inner ring, and/or several radial magnets arranged along the periphery of the inner ring. In particular, it is provided that the back-up bearing is arranged in the edge region of the inner ring and/or outer ring, and terminates largely flush with the surface of the base body of the inner ring or outer ring. For example, the back-up bearing is at least partially arranged on an edge of the inner ring pointing towards the outer ring. Furthermore, it is provided that the axial and radial magnets comprise electromagnets. In particular, the electromagnets each have a coil which can be supplied with an electrical voltage to generate the magnetic field. By controlled application of an electrical voltage to the coil, the magnetic field created by the coil can be controlled. In particular, it is provided that the back-up bearing is integrated in the inner ring and/or outer ring such that it forms the beveling plane provided for the outer ring and/or inner ring.

Advantageous embodiments and refinements of the invention are given in the subclaims and the description with reference to the drawings.

According to a further preferred embodiment of the present invention, it is provided that the outer ring is configured multipiece and in assembled state has a recess open towards the inside, into which the inner ring protrudes. In this way, advantageously a magnetic bearing can be created in which the outer ring surrounds the inner ring. Thus parts of the outer ring are connected together, preferably separably, by fixing means. In particular, it is provided that the outer ring, the inner ring and integrated back-up bearing are stacked as rotationally symmetrical rings to form the magnetic bearing.

According to a further preferred embodiment of the present invention, it is provided that the back-up bearing has a first back-up bearing part and a second back-up bearing part, wherein the first back-up bearing part is integrated into the inner ring and the second back-up bearing part is integrated into the outer ring. In particular, the first back-up bearing part and the second back-up bearing part are configured such that the first back-up bearing part and the second back-up bearing part are opposite each other both in the axial direction and in the radial direction. Here, the first back-up bearing part and the second back-up bearing part are separated from each other by a gap arranged between the inner ring and the outer ring. Furthermore, it is conceivable that the first back-up bearing part and the second back-up bearing part are configured along their periphery so as to provide a beveling plane for the magnetic bearing. Preferably, it is provided that the first back-up bearing part or second back-up bearing part is configured integrally and extends along the entire periphery of the inner ring or outer ring, for example along the entire edge of the inner ring or outer ring.

According to a further embodiment of the present invention, it is provided that the back-up bearing comprises a flux separation for decoupling the different magnetic circuits. Here, the different magnetic fields are preferably emitted by different magnets, in particular electromagnets. In particular, the flux separation is arranged between one of the axial magnets and one of the radial magnets. In this way, the magnetic fields can be set for a radial and an axial arrangement of the bearing parts, i.e. the inner ring and outer ring, largely unaffected by adjacent magnetic fields.

According to a further embodiment of the present invention, it is provided that the shielding device is made of aluminum, austenitic steel, bronze and/or ceramic, or another non-magnetic material. In particular, it is provided that the back-up bearing is made of a non-magnetic material, and forms the flux separation. By the use of aluminum, austenitic steel, bronze and/or ceramic, the magnetic fields can be mutually decoupled particularly effectively.

According to a further embodiment of the present invention, it is provided that the axial and radial magnets comprise pole shoes for orientation of the magnetic fields. Using the pole shoes, the magnetic field which is created by one of the coils wound around the pole core, can be oriented in a targeted fashion, whereby the power loss of the magnetic bearing can advantageously be reduced. In particular, it is provided that the pole shoes are formed as parts of a circle. In other words, the pole shoes are preferably configured curved such that their curvature is matched to a radius of the inner ring or outer ring. Preferably, the pole shoes are arranged adjacent to each other along the inner ring or outer ring and form a circle.

According to a further embodiment of the present invention, it is provided that several axial or radial magnets are connected together via a one-piece or two-piece pole shoe. For this, it is preferably provided that the one-piece or two-piece pole shoes have protrusions which each form a pole core for one of the axial magnets or radial magnets, in that the protrusions are surrounded by or wrapped by a coil. In this way, fewer bores are required for mounting the pole shoe, which has an advantageous effect on the individual magnetic fields. In particular, the two-piece pole shoes are provided for connecting several radial magnets, and the one-piece pole shoes for connecting several axial magnets. Furthermore, it is provided that the two-piece pole shoe consists of two substantially congruent pole shoe halves, which in assembled state form the pole shoe via which the several axial magnets or radial magnets are connected together.

According to a further embodiment of the present invention, it is provided that the one-piece pole shoe has a substantially annular or partially circular base body, wherein at least one protrusion protrudes from the annular or partially circular base body, wherein the protrusion is surrounded by a coil to form an axial or radial magnet. Here, the protrusion is preferably an integral part of the axial or radial magnet. In particular, the one-piece pole shoe has one protrusion for each axial magnet or radial magnet. In particular, it is conceivable that all axial magnets are connected together via a single common pole shoe. The configuration of such common pole shoes allows a reduction in the total number of components which must be assembled to form the magnetic bearing. This has an advantageous effect on the costs incurred in production, and reduces the probability that, after assembly of the magnetic bearing, individual axial and/or radial magnets are arranged at irregular intervals. As well as this improvement in relation to production tolerance, as the number of pole shoes decreases, the number of air gaps between the individual pole shoes is also reduced, which finally has an advantageous effect on the magnetic fields created. In particular, it is provided that the one-piece or two-piece pole shoe is made from the annular base body, in that the individual protrusions are milled out of the base body.

According to a further embodiment of the present invention, it is provided that the two-piece pole shoe, in assembled state, surrounds the substantially annular or partially circular base body with the at least one protrusion. Preferably, the two-piece pole shoe comprises two pole shoe halves which are arranged on top of each other to form the pole shoe, preferably in a direction running parallel to the rotation axis. For example, the pole shoe halves are screwed onto the stator from above and below. In particular, as in a one-piece pole shoe, it is provided that the protrusion is surrounded, in particular wrapped, by a coil to form an axial or radial magnet. Here, it is preferably provided that all radial magnets are connected together via a common pole shoe which is made of two pole shoe halves. Furthermore, it is provided that the protrusions in the radial magnets extend radially, preferably in the direction towards a center of the magnetic bearing, and/or the protrusions for the axial magnets extend in a direction running substantially parallel to the rotation axis.

According to a further embodiment of the present invention, it is provided that the magnetic bearings have axial magnets and radial magnets which are arranged in respective opposing regions of the inner ring or outer ring. In this way, the bearing parts can be mounted in both the radial direction and in the axial direction.

According to a further embodiment of the present invention, it is provided that an air channel or a system of air channels is arranged on the outer ring and/or the inner ring. In particular, the air channels extend along the regions in which axial magnets and radial magnets are arranged. The air channels are configured open towards the gap between the inner ring or outer ring. Preferably, the air channels are formed as grooves which run for example along the periphery of the inner ring or outer ring. Alternatively, it is conceivable that instead of an air channel, the magnetic bearing has a magnetic steel sheet. This embodiment reduces the rotational braking forces from eddy currents in rapidly rotating rotors.

According to a further embodiment of the present invention, it is provided that the back-up bearing has a lubrication bore. Using the lubrication bore, lubricant can be introduced into the back-up bearing without for example the outer ring having to be removed.

According to a further embodiment of the present invention, it is provided that the axial magnets and/or the radial magnets can be actuated individually or in a group. In this way, the magnetic fields of the axial magnets and the radial magnets can advantageously be directed and controlled as simply as possible. In particular, in operation, for example on unexpected deviations from a nominal magnetic field, the magnetic fields can advantageously be changed, in particular corrected, and for example selected such that they compensate for failed magnetic field. Furthermore, it is provided that the magnets can be actuated individually or in groups in order to drive the rotor of the magnetic bearing and mount this relative to the stator.

According to a further embodiment of the present invention, it is provided that the magnetic bearing has an emergency power supply, for example in the form of an energy store such as a battery, and/or axial magnets are connected into a passive emergency braking circuit. In the event of a malfunction, using the emergency braking circuit and/or the emergency power supply, effective counter-measures can be taken which prevent the rotor from being flung out of the magnetic bearing.

According to a further embodiment of the present invention, it is provided that the magnetic bearing has a sensor device for monitoring a distance between the inner ring and the outer ring. In particular, a magnetic field or magnetic field intensity is measured by the sensor device. It is conceivable, for example, that the distance between the inner ring and the outer ring is monitored in a direction running parallel to the rotation axis and in a direction running perpendicular to the rotation axis. Preferably, a coil, in particular a coil of one of the radial or axial magnets, is used for monitoring and via this a field change is detected, which in turn is used to determine a distance change. It is however also conceivable that a Hall effect sensor is used to determine the magnetic field or monitor the distance. By measuring the magnetic field for determining the distance between the inner ring and outer ring, additional complex measurement devices can be omitted. Instead, the magnetic field which is in any case provided by the axial magnets and radial magnets of the magnetic bearing is used for measurement.

According to a further embodiment of the present invention, it is provided that the magnetic bearing comprises redundant sensor devices, preferably in the air channel. In this way, on failure of one of the sensor devices, operation of the magnetic bearing can be maintained.

A further object of the present invention is a method for operation of a magnetic bearing according to the invention, wherein the axial magnets and/or the radial magnets are actuated such that a minimum gap is formed between the inner ring and the outer ring with a gap width of less than 2 mm, preferably with a gap width between 1.2 mm and 1.8 mm, and particularly preferably with a gap width of 1.5 mm.

Compared with the prior art, the axial magnets and/or radial magnets may simultaneously be used for mounting and for drive. In particular, due to the particularly small distance between the inner ring and outer ring, it is guaranteed that the magnetic bearing makes optimal use of an action range of the magnetic fields created. Here, it must be taken into account in particular that, as the distance from the source of the magnetic field increases, the magnetic field intensity diminishes. Thus advantageously, the drive for the magnetic bearing can be integrated in the inner ring and the outer ring. The axial and/or radial magnets here are preferably coils which can be actuated by application of an electrical voltage. In particular, it is provided that, to prevent dips in the power curve, individual coils are actuated or regulated by the application of pretension force. It is for example also conceivable that the outer ring and/or the inner ring are operated by an asynchronous linear drive. Furthermore, it is conceivable that, in addition to the asynchronous linear drive, by the operation of the axial and/or radial magnets, at least partially a supporting force is provided which is necessary for the contactless arrangement of the outer ring and inner ring. In particular, axial and/or radial magnets, preferably a group of axial and/or radial magnets, can be loaded at least partially with traveling wave fields.

According to a further embodiment of the present invention, it is provided that the axial magnets and/or radial magnets are actuated such that a nominal value is maintained for the width of the minimum gap between the inner ring and the outer ring. It is here clear to the person skilled in the art that this means that the nominal value is held constant within a tolerance range. By means of a regulating circuit provided for this, it is possible, e.g. on a potential imbalance, to intervene by regulating the operation of the magnetic field bearing.

According to a further embodiment of the present invention, it is provided that on failure of one of the axial magnets, one of the radial magnets or one of the sensor devices, operation of the magnetic bearing is maintained. It is here conceivable that operation is maintained in some cases with reduced power.

Further details, features and advantages of the invention arise from the drawings and from the description below of preferred embodiments with reference to the drawings. The drawings illustrate merely exemplary embodiments of the invention which do not restrict the inventive concept.

FIG. 1 shows on the left an inner ring 1 and on the right an outer ring 2 of a magnetic bearing 10 according to an exemplary embodiment of the present invention. It is here provided that the inner ring 1 forms a stator and the outer ring 2 forms a rotor. It is also conceivable that the inner ring 1 forms the rotor and the outer ring 2 forms the stator. For contactless mounting of the inner ring 1 and outer ring 2, axial magnets 11 and radial magnets 12 are provided which are part of the inner ring 1 or outer ring 2. In particular, it is provided that two axial magnets 11 are arranged in respective opposing regions of the inner ring 1 or outer ring 2, and two radial magnets 12 are arranged in respective opposing regions of the inner ring 1 or outer ring 2. A magnetic field is emitted by each individual axial and radial magnet, whereby finally the contactless arrangement and mounting of the outer ring 2 relative to the inner ring 1 is implemented. In the embodiment shown, the axial magnets 11 and the radial magnets 12 are arranged on the inner ring 1.

FIG. 2 shows in a sectional view on the left the inner ring 1, and on the right the outer ring 2 of the magnetic bearing 10 according to the exemplary embodiment of the present invention. In particular, the inner ring shown on the left of FIG. 2 comprises a back-up bearing 3, which captures the rotor in the event of a power failure and thus prevents the rotor—which would otherwise leave the magnetic bearing 10—from causing damage to its environment. For example, the back-up bearing 3 comprises a first back-up bearing part 3' and a second back-up bearing part 3", wherein the first back-up bearing part 3' is integrated in the inner ring and the second back-up bearing part 3" is integrated in the outer ring. The first back-up bearing part 3' and the second back-up bearing part 3" are configured such that they form a beveling plane in the magnetic bearing. Preferably, the first and second back-up bearing parts 3' and 3" are arranged curved along mutually opposing sides, or the edges are rounded. Furthermore, it is provided that the first back-up bearing part 3' and/or the second back-up bearing part 3" is arranged along the periphery of the inner ring 1 and/or the outer ring 2, between one of the axial magnets 11 and one of the radial magnets 12. Preferably, the first back-up bearing part 3' is arranged in an edge region of the inner ring 1, and the second back-up bearing part 3" is arranged in a corner region of the outer ring 2. It is preferably provided that, by the choice of material from which the back-up bearing 3 is made, the back-up bearing 3 forms a shielding device with which the various magnetic fields emitted by the different magnets, i.e. the axial magnets 11 and/or the radial magnets 12, can be shielded from each other. In this way, advantageously, the magnetic fields can each be set more precisely, since for example possible overlays which are difficult to estimate can remain substantially disregarded. In particular, it is provided here that the back-up bearing 3 is made of aluminum, austenitic steel, bronze and/or ceramic. Preferably, the back-up bearing 3 comprises lubrication bores via which the back-up bearing 3 can be supplied with lubricant at comparatively low cost. For the outer ring 2 shown on the right-hand side of FIG. 2, it is provided that this comprises an air channel 5 or a system of channels.

Figure 3:
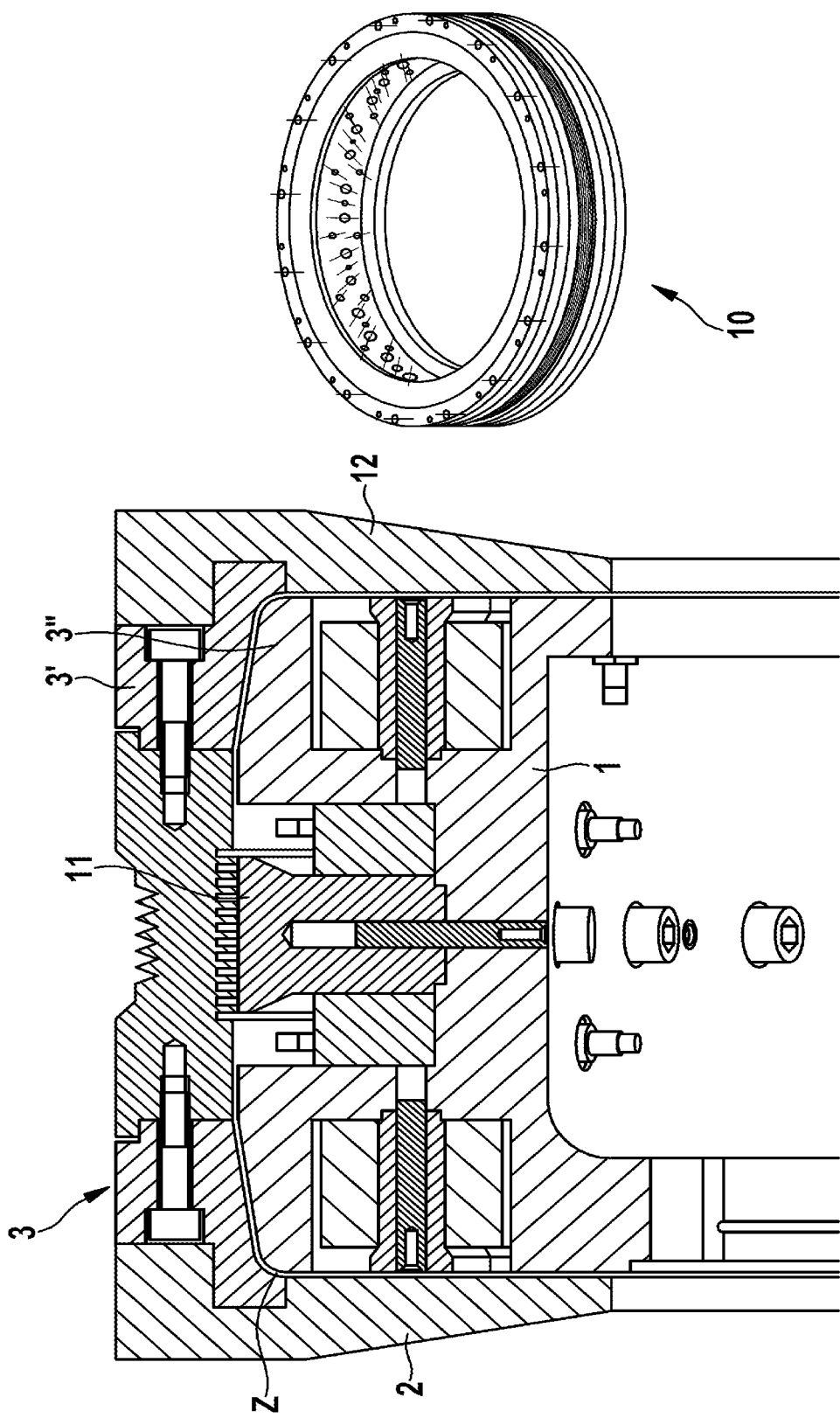
FIG. 3 includes a sectional view (left) and a perspective view (right) of an example magnetic bearing that includes an outer ring and an inner ring.

FIG. 3 shows in a sectional view and in a perspective view a magnetic bearing 10 assembled from the inner ring 1 and outer ring 2 according to the first exemplary embodiment of the present invention. It is provided here that the outer ring 2 is configured multipiece and, in assembled state, has a recess open towards the inside, into which the inner ring 1 protrudes. In this way, the outer ring 2 surrounds the inner ring 1 on its outside. Furthermore, it is provided that the distance between the outer ring 2 and the inner ring 1 is substantially less than 3 mm, preferably less than 2 mm, and particularly preferably amounts to 1.5 mm. In particular, the distance between the inner ring 1 and the outer ring 2 along a gap Z between the inner ring 1 and outer ring 2 remains substantially constant. Furthermore, it is conceivable that the magnetic bearing 10 has an emergency power supply which replaces a regular power supply on failure thereof.

Figure 4:
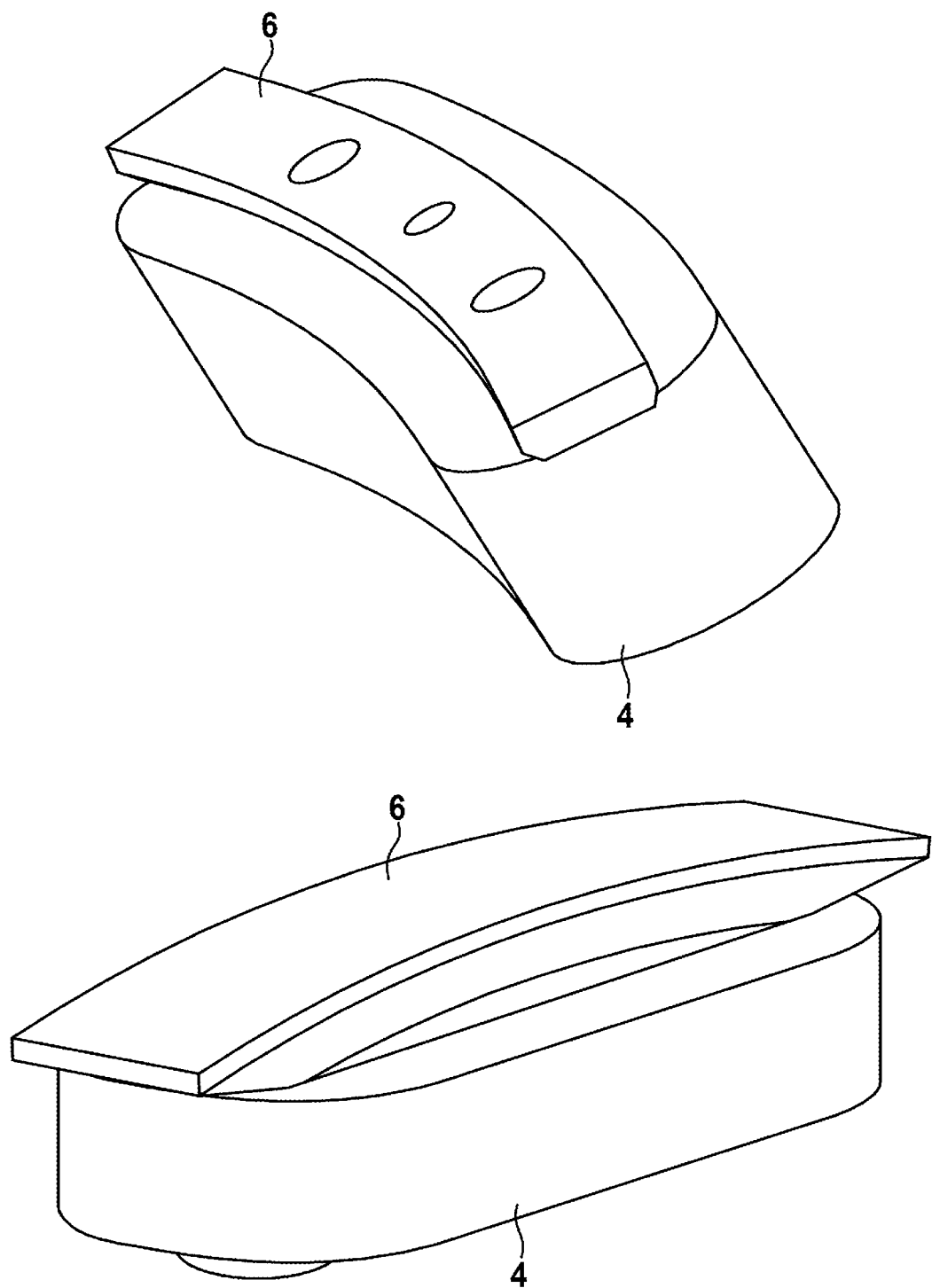
FIG. 4 is a perspective view of example pole shoes for an outer ring or an inner ring of a magnetic bearing.

FIG. 4 shows an axial magnet 11 and a radial magnet 12 which are suitable for forming the magnetic bearing 10 according to the first exemplary embodiment of the magnetic bearing, wherein an axial magnet 11 is illustrated on the left side, and a radial magnet 12 on the right side of FIG. 4. Both the axial magnet 11 and the radial magnet 12 shown comprise a pole shoe 6 which is surrounded at least partially, in particular along its periphery, by a coil 4. Use of the pole shoe 6 facilitates the orientation of the respective magnetic field, whereby finally the magnetic bearing of the inner ring 1 and outer ring 2 is further improved. Furthermore, it is provided that the pole shoe 6 is curved or arched, in particular in the form of a partial circle or segment. Preferably, it is provided that the curvature is matched to a radius of the inner ring 1 or outer ring 2, and the outer ring 2 or inner ring 1 is formed by the succession of several segment-like pole shoes 6 with respective coil.

FIG. 5 shows an arrangement of sensor devices for a magnetic bearing 10 according to the exemplary embodiment of the present invention. It is provided here that the magnetic bearing 10 has axial magnet sensors 21 and radial magnet sensors 22, which are preferably integrated peripherally in the air channel 5. In particular, the axial magnet sensors 21 are arranged at regular intervals around the magnetic bearing 10. For example, viewed from the bearing center point, an angle between two axial magnet sensors 21 has a value of approximately 22.5°. It is however also conceivable that the sensor devices, in particular redundant sensor devices, are arranged peripherally at irregular intervals. In particular, it is provided that the sensor devices are arranged at positions at which the greatest amplitudes are expected for a possible inherent frequency of the magnetic bearing 10. Furthermore, it is conceivable that the axial magnet sensors 21 and/or the radial magnet sensors 22 are in particular glued onto the axial magnets 11 or radial magnets 12, or bolted to the inner ring 1 or outer ring 2. In addition, it is conceivable that redundant sensor devices are fitted in order to maintain the operation of the magnetic bearing 10 to a sufficient extent, even on failure of a sensor device. Preferably, by a targeted redundant arrangement of the sensor devices, the position of the inner ring 1 or outer ring 2 is doubly secured, in particular if the magnetic bearing 10 is operated with a comparatively unfavorable inherent frequency. One example for a redundant arrangement of axial magnet sensors 21 and radial magnet sensors 22 is shown on the right-hand side of the magnetic bearing shown in FIG. 5.

LIST OF REFERENCE SIGNS

1 Inner ring
2 Outer ring
3 Back-up bearing
3' First back-up bearing part
3" Second back-up bearing part
4 Coil
5 Air channels
6 Pole shoes
10 Magnetic bearing
11 Axial magnet
12 Radial magnet
21 Axial coil sensor
22 Radial coil sensor
D Rotation axis
Z Gap

What is claimed is:
1. A magnetic bearing comprising:
an inner ring;
an outer ring, wherein the inner ring and the outer ring are concentric and are mounted rotatably relative to one another by way of axial and radial magnets; and
a back-up bearing including a first back-up bearing part and a second back-up bearing part, the first back-up bearing part being integrated into the inner ring as a component separate from the inner ring and the second back-up bearing part being integrated into the outer ring as a component separate from the outer ring, the first and second back-up bearing part configured such that the first back-up bearing part and the second back-up bearing part lie opposite one another both along an axial direction and along a radial direction.

2. The magnetic bearing of claim 1 wherein the outer ring is multipiece and in an assembled state includes a recess that opens inwards, wherein the inner ring protrudes into the recess of the outer ring.

3. The magnetic bearing of claim 2 wherein the outer ring engages around an outer side of the inner ring, and where the first back-up bearing part is disposed in an edge region of the inner ring and the second back-up bearing part is disposed in a corner region of the outer ring.

4. The magnetic bearing of claim 1 wherein the back-up bearing comprises a flux separation for mutual decoupling of different magnetic circuits.

5. The magnetic bearing of claim 1 wherein the back-up bearing is comprised of at least one of aluminum, austenitic steel, bronze, or ceramic, the back-up bearing operating as a shielding device that shields magnetic fields emitted by the axial and radial magnets from one another.

6. The magnetic bearing of claim 1 wherein the axial and radial magnets comprise a pole shoe for orientation of magnetic fields.

7. The magnetic bearing of claim 6 wherein multiple of the axial or radial magnets are connected together via the pole shoe, which pole shoe is a one-piece pole shoe or a two-piece pole shoe.

8. The magnetic bearing of claim 6 wherein the pole shoe is a one-piece pole shoe that has a substantially annular base body or a partially circular base body, wherein a protrusion protrudes from the base body and is surrounded by a coil so as to form one of the axial or radial magnets.

9. The magnetic bearing of claim 6 wherein the pole shoe is a two-piece pole shoe, which in an assembled state surrounds a substantially annular base body or a partially circular base body, with the base body including a protrusion.

10. The magnetic bearing of claim 1 further comprising an air channel or a system of air channels disposed on at least one of the outer ring or the inner ring.

11. The magnetic bearing of claim 1 wherein at least one of the axial magnets or the radial magnets is actuatable individually or collectively.

12. The magnetic bearing of claim 1 wherein at least one of the magnetic bearing further comprises an emergency power supply, or the axial magnets are connected into a passive emergency braking circuit.

13. The magnetic bearing of claim 1 further comprising redundant sensor devices.

14. The magnetic bearing of claim 1 wherein the first back-up bearing part and the second back-up bearing part are separated from each other by a gap.

* * * * *